US008669944B2

(12) United States Patent
Klinghult et al.

(10) Patent No.: US 8,669,944 B2
(45) Date of Patent: *Mar. 11, 2014

(54) TOUCH SENSITIVE DISPLAYS WITH LAYERS OF SENSOR PLATES PROVIDING CAPACITANCE BASED PROXIMITY SENSING AND RELATED TOUCH PANELS

(75) Inventors: Gunnar Klinghult, Lund (SE); Paul Leonard Futter, Cary, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1432 days.

This patent is subject to a terminal disclaimer.

(21) Appl. No.: 12/334,818

(22) Filed: Dec. 15, 2008

(65) Prior Publication Data

US 2010/0149125 A1 Jun. 17, 2010

(51) Int. Cl.
*G06F 3/041* (2006.01)

(52) U.S. Cl.
USPC .......................................................... 345/173

(58) Field of Classification Search
USPC .................................. 345/173–180; 362/273
See application file for complete search history.

(56) References Cited

U.S. PATENT DOCUMENTS

| | | | | |
|---|---|---|---|---|
| 6,104,819 | A * | 8/2000 | Nickum | 381/123 |
| 6,664,744 | B2 * | 12/2003 | Dietz | 315/291 |
| 7,525,615 | B2 * | 4/2009 | Zhang et al. | 349/116 |
| 2002/0154087 | A1 * | 10/2002 | Katsu et al. | 345/102 |
| 2006/0097991 | A1 * | 5/2006 | Hotelling et al. | 345/173 |
| 2007/0008726 | A1 * | 1/2007 | Brown | 362/276 |
| 2007/0268265 | A1 * | 11/2007 | XiaoPing | 345/173 |
| 2008/0150901 | A1 | 6/2008 | Lowles et al. | |
| 2008/0316182 | A1 * | 12/2008 | Antila et al. | 345/173 |
| 2009/0194341 | A1 * | 8/2009 | Nousiainen | 178/18.01 |
| 2011/0002143 | A1 * | 1/2011 | Saarikko et al. | 362/611 |

FOREIGN PATENT DOCUMENTS

EP 1 956 469 A2 8/2008

OTHER PUBLICATIONS

Notification of Transmittal of the International Preliminary Report on Patentability; International Preliminary Report on Patentability corresponding to International Application No. PCT/US2009/003909; Date of Mailing: Jan. 24, 2011; 7 pages.

(Continued)

*Primary Examiner* — William Boddie
*Assistant Examiner* — Sahlu Okebato
(74) *Attorney, Agent, or Firm* — Myers Bigel Sibley & Sajovec, PA

(57) ABSTRACT

An electronic touch panel includes a plurality of spaced apart first sensor plates that are arranged in a first direction on a first planar layer. A proximity sensor plate is spaced apart from and attached to the first planar layer. The proximity sensor plate has a greater surface area than a plurality of the first sensor plates. A position detection circuit is configured to electrically charge the first sensor plates to generate capacitive coupling to an adjacent user object and to detect therefrom a location of the user object relative to the first direction across the first planar layer. The position detection circuit is further configured to electrically charge the proximity sensor plate to generate a higher level of capacitive coupling to the user object than a plurality of the first sensor plates and to detect therefrom a proximity of the user object relative to a direction away from the first planar layer.

20 Claims, 4 Drawing Sheets

(56) References Cited

OTHER PUBLICATIONS

Notification of Transmittal of the International Search Report and the Written Opinion of the International Searching Authority, or the Declaration, International Search Report, Written Opinion of the International Searching Authority, PCT/US2009/003909, Date of mailing: Sep. 2, 2010, 12 pages.

* cited by examiner

TOUCH SENSITIVE DISPLAYS WITH LAYERS OF SENSOR PLATES PROVIDING CAPACITANCE BASED PROXIMITY SENSING AND RELATED TOUCH PANELS

FIELD OF THE INVENTION

This invention relates to user interfaces for electronic devices, and more particularly to touch sensitive displays for electronic devices such as wireless communication terminals.

BACKGROUND OF THE INVENTION

Touch sensitive displays are becoming a popular interface on electronic devices for users to enter commands and data used in the operation of the device. Touch sensitive displays can flow be found in mobile telephones, particularly portable music players, PDA (personal digital assistant) devices, and cellular telephones having integrated PDA features and other phone operation related features. The touch sensitive displays are generally designed to operate and respond to a finger touch, a stylus touch, or finger/stylus movement on the touch screen surface. Touch sensitive displays may be used in addition to, in combination with, or in place of physical keys traditionally used in a cellular phone to carry out the phone functions and features.

Touching a specific point on the display may activate a virtual button, feature, or function found or shown at that location on the display. Typical phone features which may be operated by touching the display include entering a telephone number, for example, by touching virtual keys of a virtual keyboard shown on the display, making a call or ending a call, bringing up, adding to or editing and navigating through an address book, and other phone functions such as text messaging, wireless connection to a wide area network, and other phone functions.

Commercial pressures to provide far more functionality within smaller physical device sizes are continuing to drive the need to provide more accurate determination of touch locations on a display.

SUMMARY OF THE INVENTION

In some embodiments of the present invention, an electronic touch panel includes a plurality of spaced apart first sensor plates that are arranged in a first direction on a first planar layer. A proximity sensor plate is spaced apart from and attached to the first planar layer. The proximity sensor plate has a greater surface area than a plurality of the first sensor plates. A position detection circuit is configured to electrically charge the first sensor plates to generate capacitive coupling to an adjacent user object and to detect therefrom a location of the user object relative to the first direction across the first planar layer. The position detection circuit is further configured to electrically charge the proximity sensor plate to generate a higher level of capacitive coupling to the user object than a plurality of the first sensor plates and to detect therefrom a proximity of the user object relative to a direction away from the first planar layer.

In some further embodiments, the position detection circuit includes a comparator circuit that generates a proximity signal that identifies when a charge level of the proximity sensor plate reaches a threshold level to indicate that the user object has become proximately located to the proximity sensor plate and/or indicate that the user object is no longer proximately located to the proximity sensor plate.

In some further embodiments, the comparator circuit further generates a position signal that identifies when a charge level of a defined one or more of the first sensor plates reaches a threshold level to indicate that the user object is nearly touching the defined one or more of the first sensor plates.

In some further embodiments, the touch panel further includes a plurality of second sensor plates arranged in a second direction across a second planar layer. The first planar layer is stacked on the proximity sensor plate. The second planar layer is stacked on the first planar layer opposite to the proximity sensor plate. The position detection circuit is further configured to electrically charge the second sensor plates to generate capacitive coupling to the user object and to detect therefrom a location of the user object relative to the second direction across the second planar layer.

In some further embodiments, the proximity sensor plate is spaced apart from the first planar layer by a distance that is at least twice a combined thickness of the stacked first and second sensor plates and the stacked first and second layers to increase spatial differentiation between an amount of capacitive coupling that is obtained between the user object and the first and second sensor plates and an amount of capacitive coupling that is obtained between the user object and the proximity sensor plate.

In some further embodiments, the position detection circuit includes a comparator circuit that generates a proximity signal that identifies when a charge level of the proximity sensor plate changes at least a threshold amount relative to a charge level of at least one of the first sensor plates to indicate that the user object has become proximately located to the proximity sensor plate and/or that the user object is no longer proximately located to the proximity sensor plate.

In some further embodiments, the first sensor plates are arranged in a plurality of spaced apart columns, with each of the first sensor plates being serially connected in each column and electrically isolated from first sensor plates in other columns. The second sensor plates are arranged in a plurality of spaced apart rows, with each of the second sensor plates being serially connected in each row and electrically isolated from second sensor plates in other rows. The proximity sensor plate extends beneath at least a majority of the first and second sensor plates. The position detection circuit is further configured to detect a location of the user object relative to the columns of first sensor plates, relative to the rows of second sensor plates, and relative to the proximity sensor plate in a direction away from the columns and rows of the first and second sensor plates.

In some further embodiments, the proximity sensor plate extends beneath all of the first and second sensor plates.

In some further embodiments, the touch panel further includes a liquid crystal display with an image rendering layer that is configured to control light transmissivity through pixel locations therein responsive to a display control signal and including a metallic reflector layer that is configured to direct light through the image rendering layer. The metallic reflector layer includes the proximity sensor plate.

In some further embodiments, the position detection circuit is further configured to generate a position signal that indicates a location of the user object relative the plane of the image rendering layer and relative to a direction away from the plane of the image rendering layer.

In some further embodiments, the touch panel further includes a controller that includes a user application that is configured to determine from the position signal a three dimensional location of the user object relative to an image that is displayed by the image rendering layer.

In some further embodiments, the proximity sensor plate extends along at least a majority of the edge regions of the image rendering layer.

In some further embodiments, the controller circuit is configured to turn on backlighting for a display device in response to the position detection circuit detecting through the proximity sensor plate that the user object has become proximately located thereto.

In some further embodiments, the controller circuit is configured to trigger a wireless terminal to answer an incoming phone call in response to the position detection circuit detecting through the proximity sensor plate that the user object has become proximately located thereto.

In some further embodiments, the controller circuit is configured to selectively connect an ear speaker to an audio channel and to disconnect a loudspeaker from the audio channel in response to the position detection circuit detecting through the proximity sensor plate that the user object has become proximately located thereto, and to disconnect the ear speaker from the audio channel and to connect the loudspeaker to the audio channel in response to the position detection circuit detecting through the proximity sensor plate that the user object has become not proximately located thereto.

In some other embodiments, the touch sensitive display includes an image rendering layer, a metallic reflector layer, a plurality of first and second sensor plates, and a position detection circuit. The image rendering layer is configured to control light transmissivity through pixel locations therein responsive to a display control signal. The metallic reflector layer is configured to direct light through the image rendering layer. The first sensor plates are arranged in a plurality of spaced apart columns on a first layer between the image rendering layer and the metallic reflector layer. Each of the first sensor plates are spaced apart and serially connected in each column and are electrically isolated from first sensor plates in other columns. The second sensor plates are arranged in a plurality of spaced apart rows on a second layer between the first layer and the metallic reflector layer. Each of the second sensor plates are spaced apart and serially connected in each row and are electrically isolated from the second sensor plates in other rows. The metallic reflector layer extends beneath at least a majority of the first and second sensor plates. The position detection circuit is configured to electrically charge the first sensor plates, the second sensor plates, and the metallic reflector layer to generate capacitive coupling to an adjacent user object and detect therefrom a location of the user object relative to the columns of first sensor plates, relative to the rows of second sensor plates, and relative to the metallic reflector layer in a direction away from the columns and rows of the first and second sensor plates.

In some further embodiments, the position detection circuit includes a comparator circuit that generates a proximity signal that identifies when a charge level of the proximity sensor plate reaches a threshold level and/or when a charge level of the proximity sensor plate changes at least a threshold amount relative to a charge level of at least one of the first sensor plates to indicate that the user object has become proximately located to the proximity sensor plate.

Other touch panels, touch sensitive displays, methods, and/or computer program products according to embodiments of the invention will be or become apparent to one with skill in the art upon review of the following drawings and detailed description. It is intended that all such additional touch panels, touch sensitive displays, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
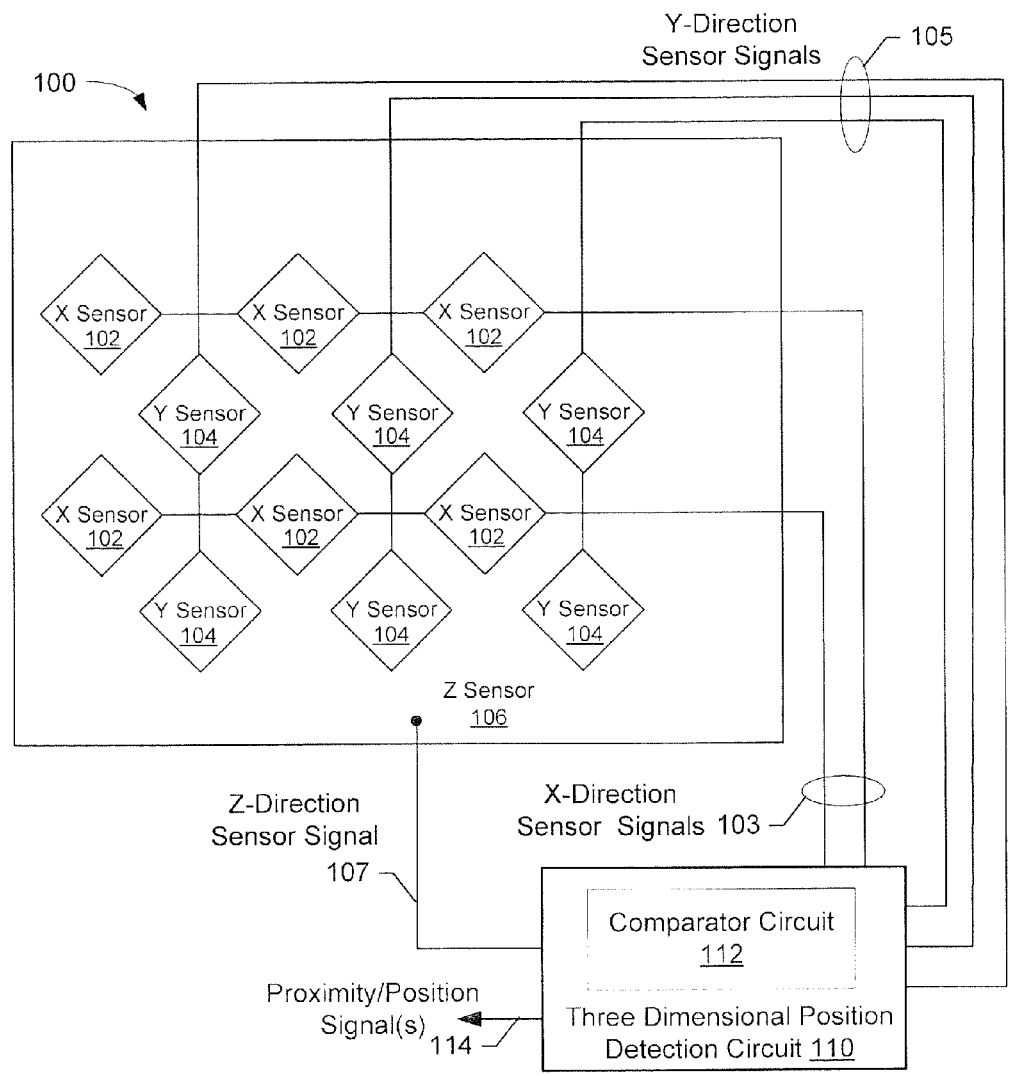
FIG. 1 is a block diagram of a touch panel and position detection circuit that compares relative capacitances of sensor plates on different layers to determine a three dimensional location of a user object according to some embodiments of the present invention.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions and elements and the distances therebetween may be exaggerated for clarity. Like numbers refer to like elements throughout.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some embodiments may be embodied in hardware (including analog circuitry and/or digital circuitry) and/or in software (including firmware, resident software, micro-code, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "circuit" and "controller" may take the form of digital circuitry, such as a logic gate array and/or computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although some embodiments of the present invention are described in the context of wireless communication terminals for purposes of illustration and explanation only, the present invention is not limited thereto. It is to be understood that the present invention can be more broadly used in any sort of electronic touch display to identify the location of user touches on a display device.

In accordance with some embodiments, an electronic touch panel is configured to sense the proximity of a user object (e.g., finger, stylus, or other object manipulated by a user) using capacitive coupling thereto. For example, a plurality of spaced apart touch sensor plates can be arranged across a planar layer. A proximity sensor plate is spaced apart from and attached to the planar layer. The proximity sensor plate has a greater surface area than a plurality of the touch sensor plates, and may have a greater surface area than the combined surface areas of the individual touch sensor plates. A position detection circuit is configured to detect a location of a user object relative to the first direction across the first planar layer and to detect a proximity of the user object relative to a direction away from the planar layer.

Figure 2:
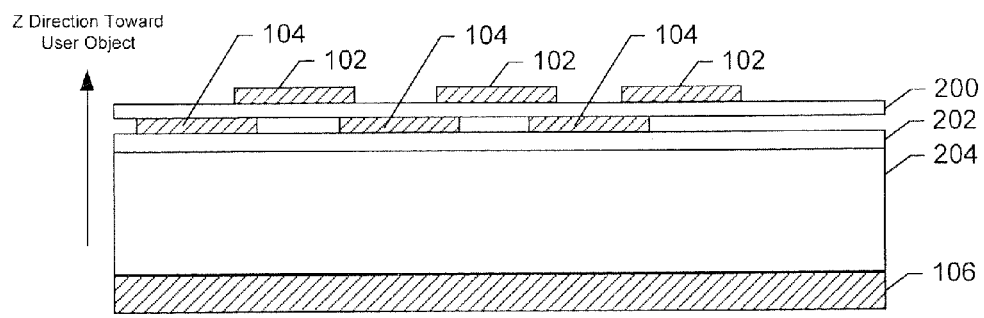
FIG. 2 is a cross sectional view of the touch panel shown in FIG. 1 according to some embodiments of the present invention.

An exemplary embodiment of a touch panel 100 with capacitive proximity sensing capability is shown by a plan view in FIG. 1 and by a cross sectional view in FIG. 2. Referring to FIGS. 1 and 2, the touch panel 100 includes a plurality of X sensor plates 102 that are arranged in a plurality of spaced apart rows on a first layer 200. Each of the X sensor plates 102 are spaced apart and serially connected in each row, via respective conductive lines 103, and are electrically isolated from X sensor plates 102 in other rows. A plurality of Y sensor plates 104 are arranged in a plurality of spaced apart columns on a second layer 202 connected to the first layer 200. Each of the Y sensor plates 104 are spaced apart and serially connected in each column, via respective conductive lines 105, and are electrically isolated from the Y sensor plates 104 in other columns.

A Z sensor plate 106 extends beneath at least some of the X sensor plates 102 and the Y sensor plates 104, and may extend beneath all of the X sensor plates 102 and the Y sensor plates 104. The Z sensor plate 106 can be spaced apart from the second layer 202 by one or more intervening structural elements/layers 204, and the distance between the Z sensor plate 106 and the second layer 202 may be substantially greater than the distance between the X sensor plates 102 and the Y sensor plates 104.

A position detection circuit 110 is configured to electrically charge separate rows of the X sensor plates 102, via lines 103, to generate capacitive coupling to an adjacent user object and to detect therefrom a location of the user object relative to the X sensor plates 102 along the X direction across the first layer 200. The position detection circuit 110 can be further configured to electrically charge separate columns of the Y sensor plates 104, via lines 105, to generate capacitive coupling to an adjacent user object and to detect therefrom a location of the user object relative to the Y sensor plates 104 along the Y direction across the second layer 202. The position detection circuit 110 can be further configured to electrically charge the Z sensor plate 106, via conductive line 107, to generate a higher level of capacitive coupling to the user object than a plurality of the X and Y sensor plates 102 and 104, and to detect therefrom a proximity of the user object relative to a perpendicular direction (Z direction) away from the Z sensor plate 106.

The position detection circuit 110 can generate one or more proximity/position signal(s) 114 that may indicate that a user object has become proximately located to the Z sensor plate 106, that the user object is no longer proximately located to the Z sensor plate 106, and/or to indicate a location of the user object relative to the X sensor plates 102 along the X direction and/or relative to the Y sensor plates 104 along the Y direction. For example, the proximity/position signal(s) 114 may indicate a distribution of charge of the X and Y rows and columns of sensors across the planes 200 and 202 so as to identify where the user object is effectively touching the touch panel 100. Accordingly, the position detection circuit 110 may indicate through the proximity/position signal(s) 114 a three-dimensional location of the user object relative to the touch panel 100.

Because the Z sensor plate 106 has a much greater surface area than the individual X sensor plates 102 and Y sensor plates 104, the position detection circuit 110 can create a much higher charge thereon to generate a much higher field strength therefrom that may be used to sense capacitive coupling between the Z sensor plate 106 and a proximately located user object at a much greater distance that can be sensed through any capacitive coupling between individual ones of the X sensor plates 102 and Y sensor plates 104 and the user object. Accordingly, the position detection circuit 110 can use the Z sensor plate 106 to sense whether a user object is proximately located to the touch panel 100, and may be further configured to determine from a level of capacitive coupling between the Z sensor plate 106 and the user object a Z dimension distance (i.e., in a direction perpendicular to the Z sensor plate 106 and the first and second layers 200 and 202) that the user object is away from the Z sensor plate 106. The position detection circuit 110 may, for example, determine the Z dimension distance to the user object based on a level of charge resident on the Z sensor 106 and a known relationship between charge levels and approximate distances to a user object that is capacitively coupled thereto.

The position detection circuit 110 can include a comparator circuit 112 that generates the proximity/position signal(s) 114 in response to at least a threshold change in a charge level of the Z sensor plate 106, so as to indicate that a user object has become proximately located to the Z sensor plate 106 and/or that the user object is no longer proximately located to the Z sensor plate 106.

Alternatively or additionally, the comparator circuit 112 may generate the proximity signal(s) 114 in response a charge level of the Z sensor plate 106 changing at least a threshold amount relative to a charge level of at least one of, or a column of, the X sensor plates 102 and/or the Y sensor plates 104, to indicate that a user object has become proximately located to the Z sensor plate 106 and/or that the user object is no longer proximately located to the Z sensor plate 106.

The Z sensor plate 106 may be spaced apart from the second layer 202 by a distance that is at least twice a combined thickness of the stacked X sensor plates 102, the first layer 200, the Y sensor plates 104, and the second layer 202 to increase spatial differentiation between an amount of capacitive coupling that is obtained between the user object and the X and Y sensor plates 102 and 104 and an amount of capacitive coupling between the user object and the/sensor plate 106, which may improve the ability of the position detection circuit 110 to detect the proximity of the user object relative to a direction away from the Z sensor plate 106.

The comparator circuit 112 may generate the proximity signal(s) 114 to identify when a charge level of a defined one or more of the X sensor plates 102 and/or the Y sensor plates 104 reaches a threshold level to indicate that the user object is touching or nearly touching the defined one or more of the first sensor plates.

It is to be understood that the embodiments shown in FIGS. 1 and 2 are provided for purposes of explanation of various exemplary concepts of the invention to those skilled in the art, however the invention is not limited thereto. Accordingly, although the sensor plates have been illustrated as being generally square shaped along a plane, they are not limited thereto and may be any shape that provides a conductive surface which can be charged to provide capacitive coupling to a user object. Moreover, although only several sensor plates have been illustrated in each row and column, it is to be understood that any number may be used and when included as part of a touch screen interface may include substantially more columns, rows, and sensor plates arranged therein to provide a enable more precise determination of the location of a user's touch relative to the matrix of sensor plates. In the drawings, the relative thicknesses and relative sizes of the layers and sensor plates are exaggerated for ease of illustration and reference.

Figure 3:
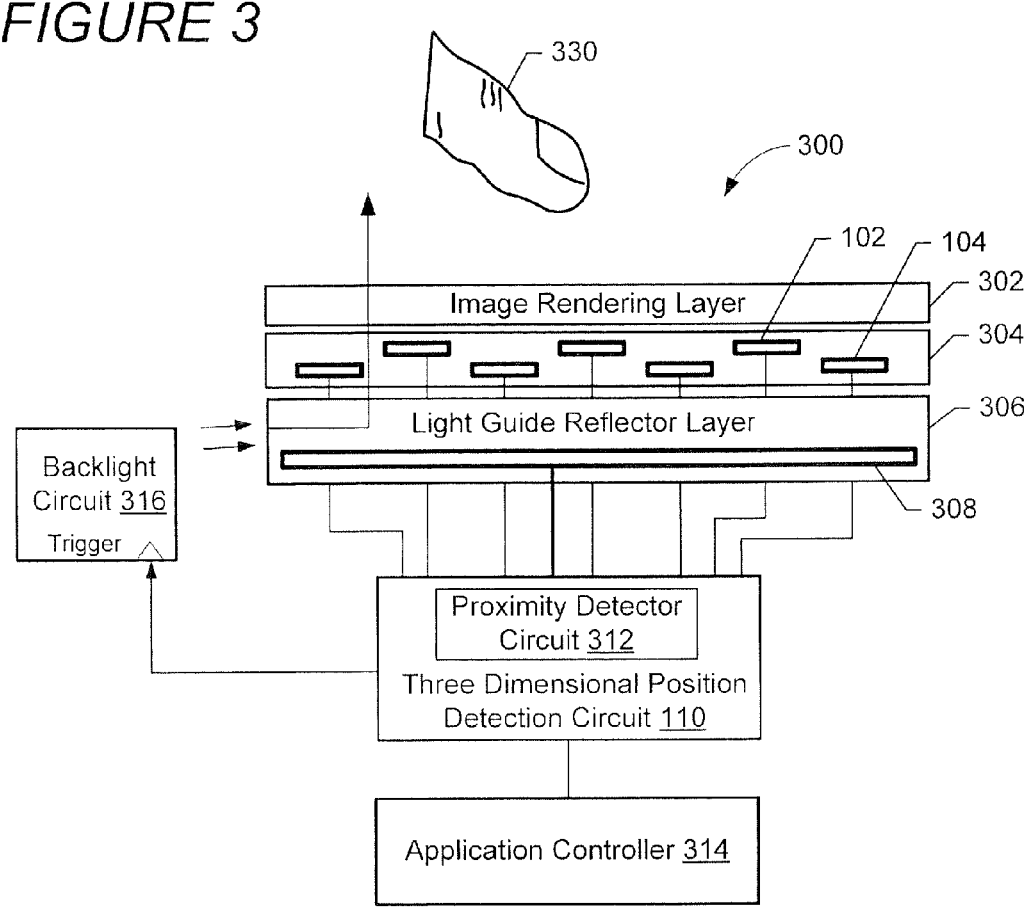
FIG. 3 is a block diagram of a display including a touch panel having capacitive proximity sensing capability according to some embodiments of the present invention.

FIG. 3 is a block diagram of a touch sensitive display 300 that is configured to sense the proximity of a user object 330, which is not touching the display 300, through capacitive coupling to the user object 330. Referring to FIG. 3, the display 300 includes an image rendering layer 302 (e.g., a liquid crystal display panel) that is configured to control light transmissivity through pixel locations therein responsive to a display control signal. A light guide 306 with a metallic reflector layer 308 is configured to direct light from a backlight circuit 316 or another light source through the image rendering layer 302. The backlight circuit 316 may include one or more light emitting diodes (LEDs) and/or other light sources (e.g., electroluminescent panel) that are configured to emit light via the light guide 306 through the image rendering layer 302.

The metallic reflector layer 308 can be configured to operate as described above for the Z sensor plate 106 shown in FIGS. 1 and 2. Alternatively or additionally, the image rendering layer 302 may include a metal layer along at least some edge regions thereof, and may extend along at least a majority of the edge regions of the image rendering layer 302, to, for example, provide structural support for the image rendering layer 302. The metal layer along the edge regions may be configured to operate as described above for the Z sensor plate 106. Thus, the position detection circuit 110 may charge the edge metal layer to sense capacitive coupling between the edge metal layer and a proximately located user object. Accordingly, when a LCD panel includes a metal structural support along edge regions, the position detection circuit 110 be electrically connected to charge the metal structural support and to sense therefrom capacitive coupling to a proximately located user object.

A plurality of sensor plates, which may be configured as described above for the X sensor plates 102 and/or the Y sensor plates 104 shown in FIGS. 1 and 2, are disposed on one or more layers 304 between the image rendering layer 302 and the light guide 306. The X sensor plates 102, the Y sensor plates 104, and the metallic reflector layer 308 forming the proximity sensor can extend parallel to a plane of the image rendering layer 302.

The position detection circuit 110 can be configured as described above with regard to FIGS. 1 and 2 to generate a proximity/position signal(s) 114 that indicates when a user object has become proximately located to the touch sensitive display 300, and which may further indicate a location of the user object relative the plane of the image rendering layer 302 and relative to a direction away from (e.g., perpendicular to) the plane of the image rendering layer 302.

The position detection circuit 110 may include a proximity detector circuit 312 that generates a proximity signal that indicates when a user object has become proximately located to the touch sensitive display 300, although the user object may not yet be touching the touch sensitive display 300. The proximity detector circuit 312 may operate in accordance with some embodiments described above for the comparator circuit 112 shown in FIG. 1.

The backlight circuit 316 may turn the light source for the image rendering layer 302 on and off in response to the proximity signal from the proximity detector circuit 312. For example, the backlight circuit 316 may be configured to turn on backlighting for the image rendering layer 302 in response to the proximity detector circuit 312 detecting that a user object has become proximately located to the proximity sensor plate 106, and/or it may turn off backlighting for the image rendering layer 302 in response to the proximity detector circuit 312 detecting that the user object is no longer proximately located to the proximity sensor plate 106.

An application controller 314 can include one or more user applications that are configured to determine from the position signal output by the position detection circuit 110 a three dimensional location of the user object relative to an image that is displayed by the image rendering layer 302. Accordingly, the application controller 314 may respond to the user object becoming proximately located to the image rendering layer 302 by causing various user selectable items to be displayed by the image rendering layer 302, and/or it may respond to the user object no longer being proximately located to the image rendering layer 302 by causing various user selectable items to no longer be displayed and/or for non-user user selectable items to be displayed by the image rendering layer 302. The application controller 314 may supply the three dimensional location as a user input to various user applications.

Figure 4:
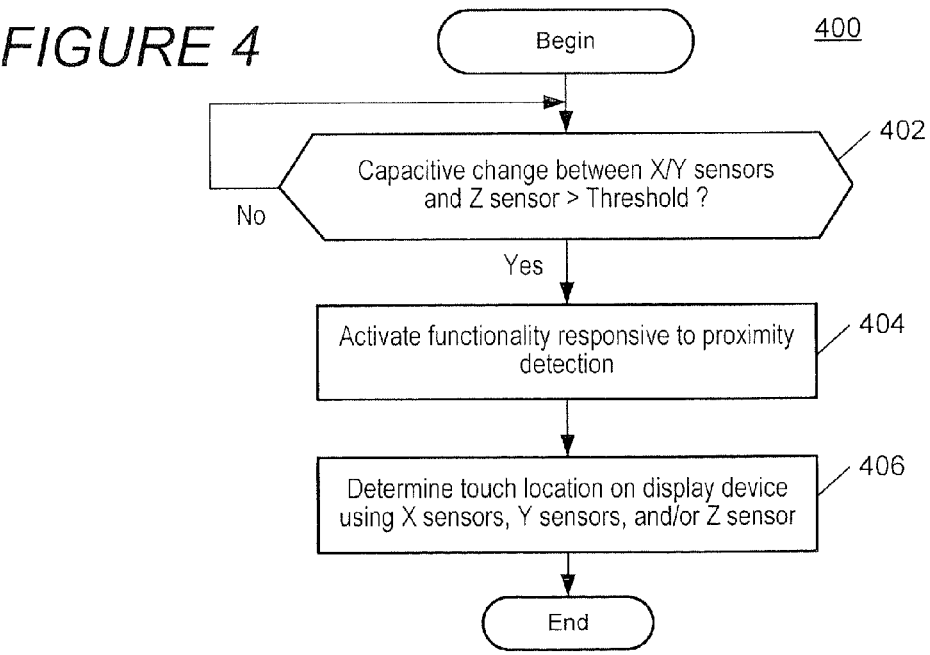
FIG. 4 is a flowchart of operations that may be carried out by the touch panel of FIG. 3 to regulate certain electronic functionality responsive to sensing proximity of a user object according to some embodiments of the present invention.

FIG. 4 is a flowchart of operations 400 that may be carried out by the touch sensitive display 300 of FIG. 3, such as by the position detection circuit 110 and the application controller 314, to regulate certain electronic functionality responsive to sensing proximity of a user object. Referring to FIG. 4, the position detection circuit 110 responds to at least a threshold change in a level of charge on the X and/or Y sensor plates 102/104 relative to a level of charge on the Z sensor plate 106 (block 402) by determining that a user object has become proximately located thereto. The application controller 314 responds by activating various application functionality (block 404), such as by activating backlighting for the image rendering layer 302 and/or by displaying user selectable items on the image rendering layer 302. The application controller 314 may further determine a three-dimensional X, Y, and Z coordinate location of the proximately located user object (block 406) and provide that information to a user application, such as to a virtual keyboard/keypad, an electronic game, a contact database, and/or another application.

Figure 5:
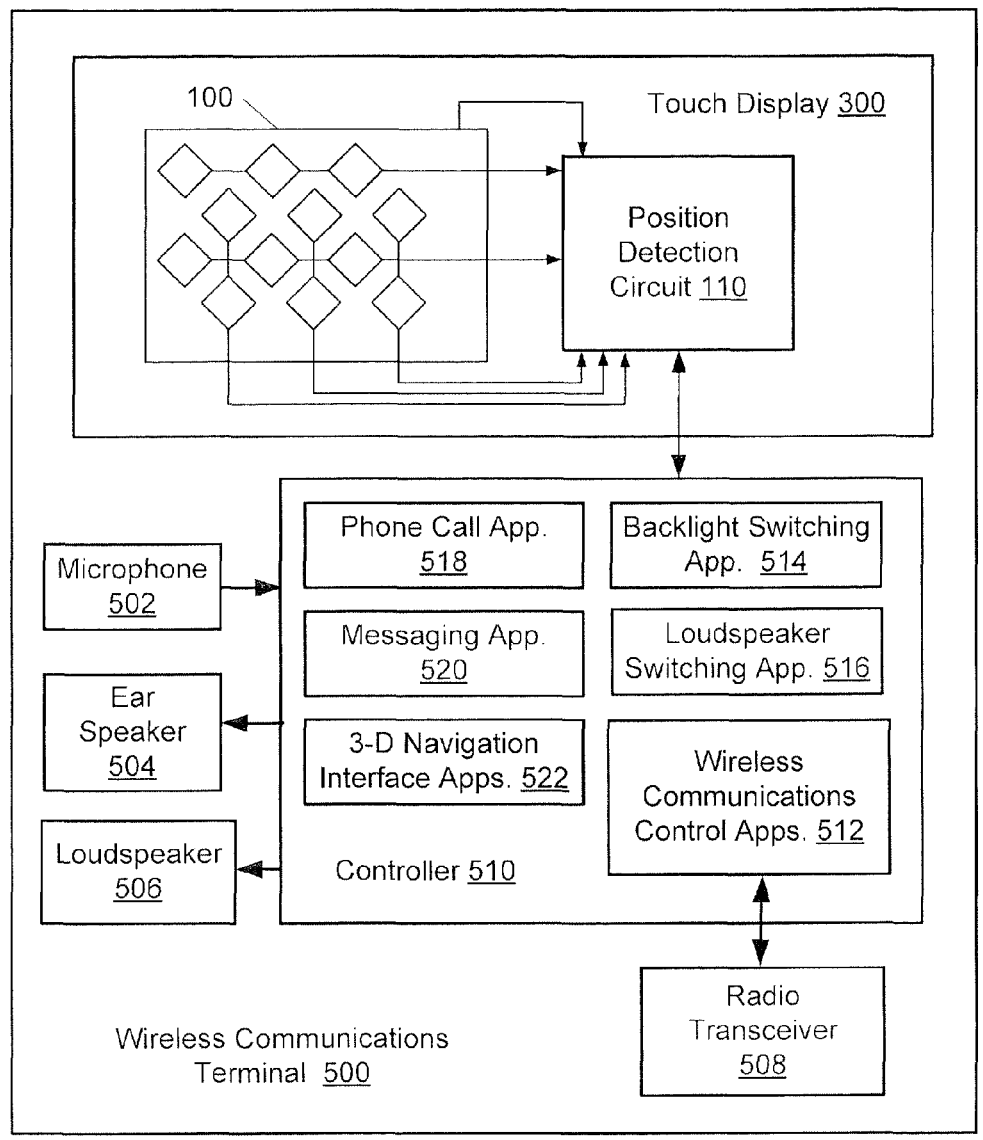
FIG. 5 is a block diagram of a wireless communications terminal including a touch panel having capacitive proximity sensing capability and an associated application functionality controller according to some embodiments of the present invention.

FIG. 5 is a block diagram of a wireless communications terminal 500 that includes a touch sensitive display 350 that is configured to sense the proximity of a user object and which may further determine the three-dimensional location of the user object relative to the display 350 and cause application functionality to respond thereto. Referring to FIG. 5, the terminal 500 further includes a controller 510, a radio transceiver 508, a microphone 502, an ear speaker 504, and a loudspeaker 506. The touch sensitive display 300 may operate as described above for the display 300 of FIGS. 3 and 4.

The controller 510 (e.g., a microprocessor) executes various application programs, such as the illustrated backlight switching application 514, loudspeaker switching application 516, phone call application 518, messaging application 520, three-dimensional navigation interface applications 522, and wireless communications applications 512. Although the various applications have been shown as being carried out by a single controller, it is to be understood that their functionality may instead be carried out by more than one controller (e.g., by a DSP and a general processor) and/or by a combination of analog and digital circuits.

The wireless communication applications 512 are configured to communicate through the radio transceiver 508 over a wireless air interface with one or more RF transceiver base stations and/or other wireless communication terminals using one or more wireless communication protocols such as, for example, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, Universal Mobile Telecommunications System (UMTS), WiMAX, and/or HIPERMAN, wireless local area network (e.g., 802.11), and/or Bluetooth. The wireless communication applications 512 may be configured to carry out wireless communications functionality, such as conventional cellular phone functionality including, but not limited to, voice/video telephone calls and/or data messaging such as text/picture/video messaging.

Figure 6:
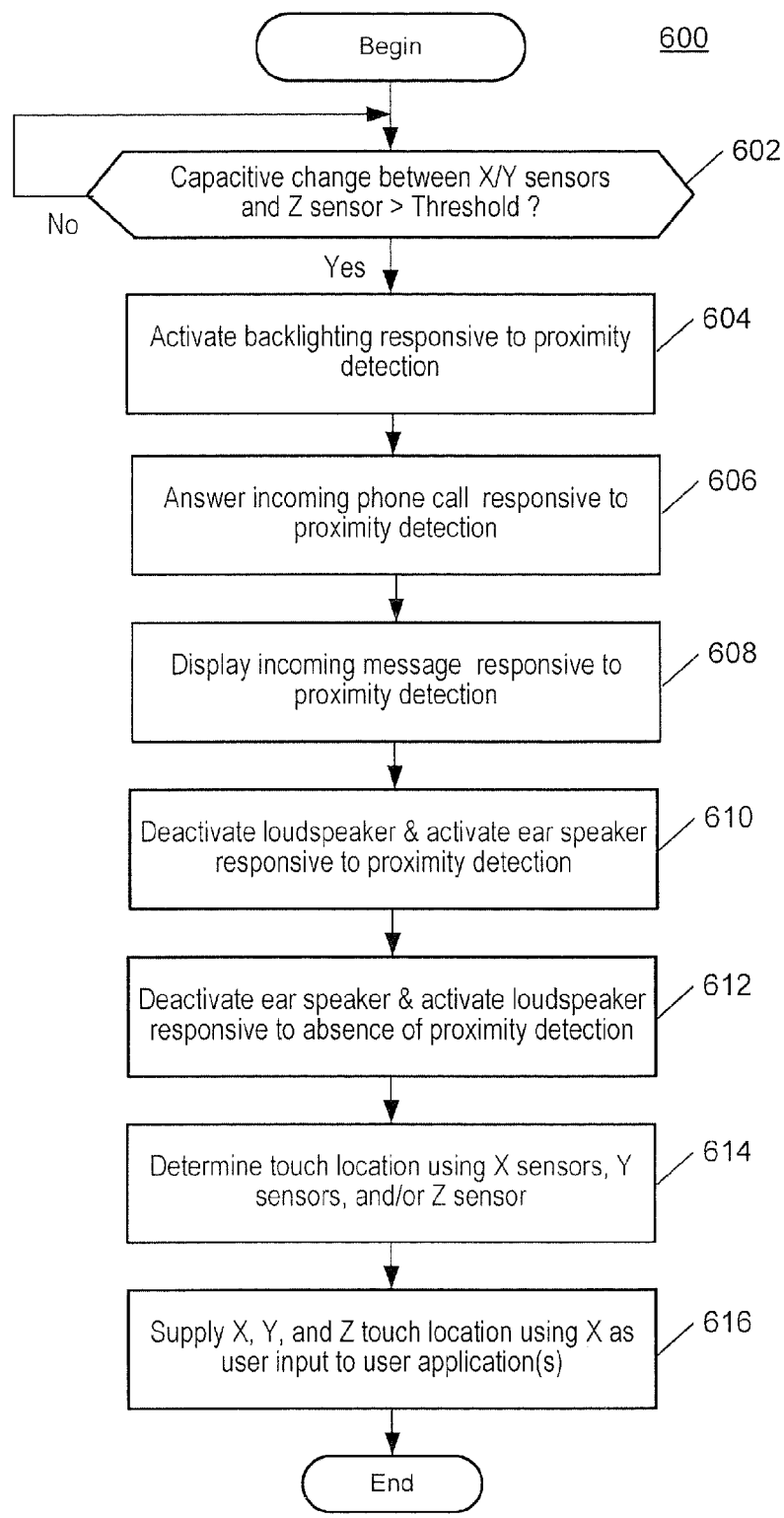
FIG. 6 is a flowchart of operations that may be carried out by the touch panel and the application functionality controller of FIG. 5 according to some embodiments of the present invention.

Various of the controller applications can respond to the proximity and/or coordinate location of a user object as determined by the position detection circuit 110. FIG. 6 is a flowchart of operations 600 that may be carried out at least in part by, for example, the controller 510 according to some embodiments of the present invention.

Referring to FIGS. 5 and 6, in response to detection of a proximately located user object, such as responsive to at least a threshold change in capacitance coupling between the Z sensor 106 alone and/or compared to capacitive coupling between the X/Y sensors 102/104 and the user object (block 602), the backlight switching application 514 can activate backlighting for the touch display 300 (block 604).

Additionally or alternatively, the phone call application 518 may respond by answering an incoming phone call (block 606) via the wireless communication applications 512 and the radio transceiver 508, and/or the messaging application 520 may respond by displaying an incoming message (block 608).

The loudspeaker switching application 516 may deactivate the loudspeaker 506 and activate the ear speaker 504 in response to detection of a proximately located user object (block 610), so that as a user places the terminal 500 to the user's ear, the sound that is being broadcasted through the loudspeaker 506 is automatically switched to being output through the ear speaker 504. The loudspeaker switching application 516 may similarly deactivate the ear speaker 504 and activate the loudspeaker 506 in response to the user object no longer being located proximate to the terminal 500 (block 612). Accordingly, sound that was being output by the ear speaker 504 may automatically be switched to being broadcasted by the loudspeaker 506 in response to the terminal 500 being moved away from the user's ear.

The navigation interface application 522 may determine a three-dimensional coordinate location of the user object (block 614). For example, the application 522 may determine the Z dimension distance (e.g., a distance along an axis that is perpendicular to a plane of the touch display 300) to the user object based on a level of charge on the Z sensor 106 and a known relationship between charge levels and approximate distances to a user object that is capacitively coupled thereto. The application 522 may determine the X and Y coordinate location of the user object based on relative charge levels of individual ones or groups of the X and Y sensor plates 102 and 104.

The navigation interface application 522 may respond to the proximity and coordinate location of the user object by activating a virtual button, feature, or function associated with or shown at that associated location on the display 300 (block 616). Various exemplary phone features that may be activated when a user object becomes proximately located to, but which may not be touching, the display 300 can include displaying a keypad/keyboard to allow a user to enter a telephone number, editing and navigating through an address book, and/or other functionality such as creating and receiving text messages and navigating to various network addresses across a wide area data network (e.g., Internet).

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An electronic touch panel comprising: a plurality of spaced apart first sensor plates arranged in a first direction on a first planar layer;
   a plurality of second sensor plates arranged in a second direction on a second planar layer;
   a proximity sensor plate that is spaced apart from and attached to the first planar layer, wherein the proximity sensor plate has a greater surface area than the plurality of the first sensor plates and the plurality of the second sensor plates, wherein the proximity sensor plate comprises a metallic reflector layer, and wherein the metallic reflector layer extends beneath at least a majority of the first and second sensor plates; and
   a position detection circuit that is configured to electrically charge the first sensor plates to generate capacitive coupling to an adjacent user object and detect therefrom a location of the user object relative to the first direction across the first planar layer, and configured to electrically charge the proximity sensor plate to generate a higher level of capacitive coupling to the user object than a plurality of the first sensor plates and to detect therefrom a proximity of the user object relative to a direction away from the first planar layer.

2. The electronic touch panel of claim 1, wherein the position detection circuit comprises a comparator circuit that generates a proximity signal that identifies when a charge level of the proximity sensor plate reaches a threshold level to indicate that the user object has become proximately located to the proximity sensor plate and/or that the user object is no longer proximately located to the proximity sensor plate.

3. The electronic touch panel of claim 2, wherein the comparator circuit further generates a position signal that identifies when a charge level of a defined one or more of the first sensor plates reaches a threshold level to indicate that the user object is nearly touching the defined one or more of the first sensor plates.

4. The electronic touch panel of claim 1,
wherein:
the first planar layer is stacked on the proximity sensor plate;
the second planar layer is stacked on the first planar layer opposite to the proximity sensor plate; and
the position detection circuit is further configured to electrically charge the second sensor plates to generate capacitive coupling to the user object and detect therefrom a location of the user object relative to the second direction across the second planar layer.

5. The electronic touch panel of claim 4, wherein:
the proximity sensor plate is spaced apart from the first planar layer by a distance that is at least twice a combined thickness of the stacked first and second sensor plates and the stacked first and second layers to increase spatial differentiation between an amount of capacitive coupling that is obtained between the user object and the first and second sensor plates and an amount of capacitive coupling that is obtained between the user object and the proximity sensor plate.

6. The electronic touch panel of claim 5, wherein the position detection circuit comprises a comparator circuit that generates a proximity signal that identifies when a charge level of the proximity sensor plate changes at least a threshold amount relative to a charge level of at least one of the first sensor plates to indicate that the user object has become proximately located to the proximity sensor plate and/or that the user object is no longer proximately located to the proximity sensor plate.

7. The electronic touch panel of claim 4, wherein:
the first sensor plates are arranged in a plurality of spaced apart columns, with each of the first sensor plates being serially connected in each column and electrically isolated from first sensor plates in other columns;
the second sensor plates are arranged in a plurality of spaced apart rows, with each of the second sensor plates being serially connected in each row and electrically isolated from second sensor plates in other rows;
the proximity sensor plate extends beneath at least a majority of the first and second sensor plates; and
the position detection circuit is further configured to detect a location of the user object relative to the columns of first sensor plates, relative to the rows of second sensor plates, and relative to the proximity sensor plate in a direction away from the columns and rows of the first and second sensor plates.

8. The electronic touch panel of claim 7, wherein:
the proximity sensor plate extends beneath all of the first and second sensor plates.

9. The electronic touch panel of claim 7, further comprising:
a liquid crystal display including an image rendering layer that is configured to control light transmissivity through pixel locations therein responsive to a display control signal and including the metallic reflector layer, wherein the metallic reflector layer is configured to direct light through the image rendering layer,
and wherein the position detection circuit is configured to electrically charge the metallic reflector layer to generate the higher level of capacitive coupling to the user object than the plurality of the first sensor plates.

10. The electronic touch panel of claim 7, further comprising:
a liquid crystal display including an image rendering layer that is configured to control light transmissivity through pixel locations therein responsive to a display control signal, wherein the first and second sensor plates and the proximity sensor plate extend parallel to a plane of the liquid crystal display,
where the position detection circuit is further configured to generate a position signal that indicates a location of the user object relative to the plane of the image rendering layer and relative to a direction away from the plane of the image rendering layer.

11. The electronic touch panel of claim 7, further comprising:
a controller that includes a user application that is configured to determine from the position signal a three dimensional location of the user object relative to an image that is displayed by the image rendering layer.

12. The electronic touch panel of claim 4, further comprising: a liquid crystal display including an image rendering layer that is configured to control light transmissivity through pixel locations therein responsive to a display control signal and including the metallic reflector layer, wherein the metallic reflector layer is configured to direct light through the image rendering layer.

13. The electronic touch panel of claim 4, further comprising:
a liquid crystal display including an image rendering layer that is configured to control light transmissivity through pixel locations therein responsive to a display control signal, wherein the first and second sensor plates and the proximity sensor plate extend parallel to a plane of the liquid crystal display,
wherein the position detection circuit is further configured to generate a position signal that indicates a location of the user object relative to the plane of the image rendering layer and relative to a direction away from the plane of the image rendering layer.

14. The electronic touch panel of claim 4, further comprising:
a liquid crystal display including an image rendering layer that is configured to control light transmissivity through pixel locations therein responsive to a display control signal and including a metal layer along at least some edge regions of the image rendering layer to provide structural support for the image rendering layer,
wherein the metal layer comprises the proximity sensor plate.

15. The electronic touch panel of claim 14, wherein the proximity sensor plate extends along at least a majority of the edge regions of the image rendering layer.

16. The electronic touch panel of claim 1, further comprising a controller circuit that is configured to turn on backlighting for a display device in response to the position detection circuit detecting through the proximity sensor plate that the user object has become proximately located thereto.

17. The electronic touch panel of claim 1, further comprising a controller circuit that is configured to trigger a wireless terminal to answer an incoming phone call in response to the position detection circuit detecting through the proximity sensor plate that the user object has become proximately located thereto.

18. The electronic touch panel of claim 1, further comprising a controller circuit that is configured to selectively connect an ear speaker to an audio channel and to disconnect a loudspeaker from the audio channel in response to the position detection circuit detecting through the proximity sensor plate that the user object has become proximately located thereto, and to disconnect the ear speaker from the audio channel and to connect the loudspeaker to the audio channel in response to the position detection circuit detecting through the proximity sensor plate that the user object has become not proximately located thereto.

19. A touch sensitive display comprising:
- an image rendering layer that is configured to control light transmissivity through pixel locations therein responsive to a display control signal;
- a metallic reflector layer that is configured to direct light through the image rendering layer;
- a plurality of first sensor plates that are arranged in a plurality of spaced apart columns on a first layer between the image rendering layer and the metallic reflector layer, wherein each of the first sensor plates are spaced apart and serially connected in each column and are electrically isolated from first sensor plates in other columns;
- a plurality of second sensor plates that are arranged in a plurality of spaced apart rows on a second layer between the first layer and the metallic reflector layer, wherein each of the second sensor plates are spaced apart and serially connected in each row and are electrically isolated from the second sensor plates in other rows,
- wherein the metallic reflector layer extends beneath at least a majority of the first and second sensor plates; and
- a position detection circuit that is configured to electrically charge the first sensor plates, the second sensor plates, and the metallic reflector layer to generate capacitive coupling to an adjacent user object and detect therefrom a location of the user object relative to the columns of first sensor plates, relative to the rows of second sensor plates, and relative to the metallic reflector layer in a direction away from the columns and rows of the first and second sensor plates.

20. The touch sensitive display of claim 19, wherein the position detection circuit comprises a comparator circuit that generates a proximity signal that identifies when a charge level of the metallic reflector layer reaches a threshold level and/or when a charge level of the metallic reflector layer changes at least a threshold amount relative to a charge level of at least one of the first sensor plates to indicate that the user object has become proximately located to the metallic reflector layer.

* * * * *